May 1, 1951 T. J. ENGLISH 2,550,791
FISHING LINE DRYING DEVICE
Filed May 17, 1947
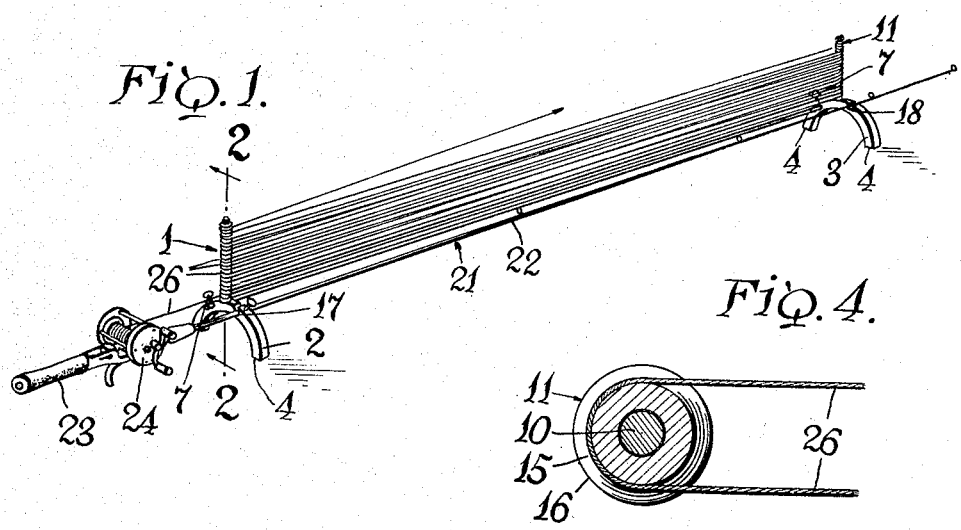
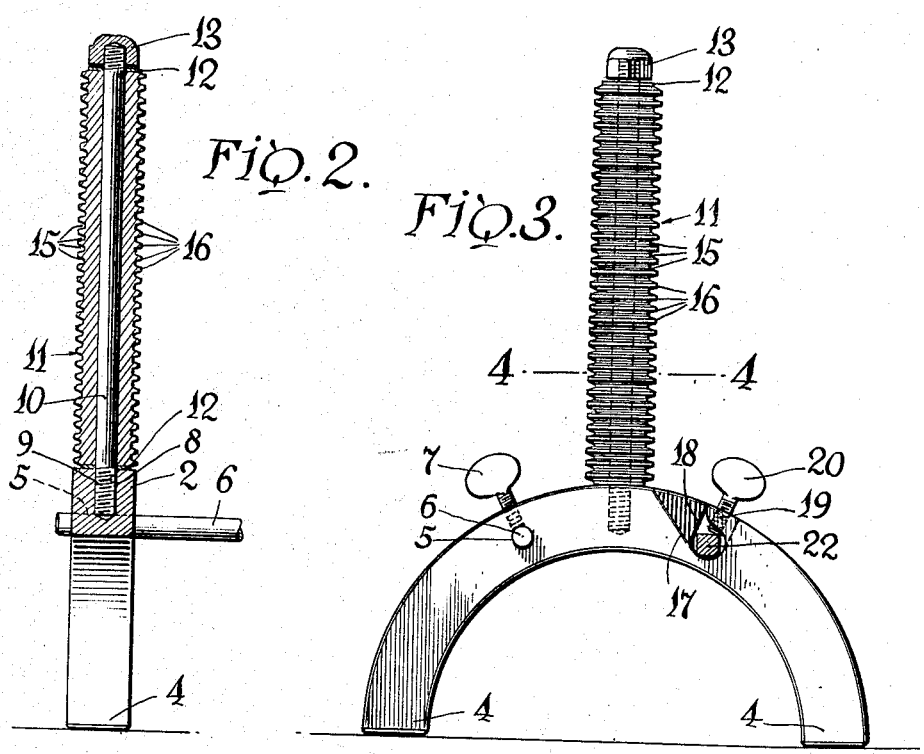
INVENTOR.
Tully J. English,
BY
ATTORNEY Patented May 1, 1951

2,550,791

UNITED STATES PATENT OFFICE 2,550,791

FISHING LINE DRYING DEVICE

Tully J. English, Buffalo, N. Y.

Application May 17, 1947, Serial No. 748,857

1 Claim. (Cl. 242—104)

This invention relates to improvements in devices for drying fishing lines.

The invention provides a line drying device having a few small, simple, and inexpensive parts which, in disassembled relation, may be conveniently carried by the fisherman along with the usual fishing paraphernalia, which may be quickly and readily assembled in any convenient place without the use of tools and as readily and quickly disassembled, and which, as assembled, provides a line drying rack by which the rod and reel may be supported in their normal operative relation whereby the line may be directly unwound from the reel, without its disassembly from the rod, and strung upon and between supporting elements by which the convolutions of the line are maintained in spaced relation, thereby to expose the line to the air with resultant quick drying effect.

In the accompanying drawing:

Figure 1 is a perspective view of the device as in use.

Figure 2 is a vertical sectional view on the line 2—2 of Figure 1.

Figure 3 is an end elevation showing the manner in which the rod is secured.

Figure 4 is an enlarged cross sectional view on the line 4—4 of Figure 3.

The parts of the device, as assembled, constitute a line drying rack 1, having two end standards 2 and 3 of inverted U-shape, each standard providing two supporting legs 4. Each standard at one side of its vertical center is formed with a transverse opening 5 to accommodate a tie rod 6 which may readily be inserted in or withdrawn from the alining openings 5, the tie rod being secured by thumb screws 7 arranged to provide adequate finger space for their manipulation.

Each support 2 and 3 at its top center is drilled and tapped, as at 8, to receive the threaded lower end 9 of a vertical rod 10 upon which a vertical line spacing and supporting roller 11 is mounted for free rotation. A pair of wear washers 12 may be freely mounted on rod 10, one between the lower end of roller 11 and the standard by which it is supported and the other between the upper end of roller 11 and a cap nut 13 screwed upon the threaded upper end of the rod 10. A slight clearance between cap nut 13 and the adjacent washer 12 prevents binding at the ends of the roller during its free rotation on rod 10.

The entire surface of each roller 11 is formed with parallel circumferentially extending line receiving grooves 15 which provide circumferential parallel line separating serrations 16, the grooves and the serrations being in alternate relation and the serrations preferably being of substantial V-shape in cross section and having inclined side faces.

At the side of its vertical center opposite the openings 5, the supports 2 and 3 are formed with notches 17 and 18, respectively, to accommodate a fishing rod. The notch 18 extends radially whereas the notch 17 is angularly disposed relatively to the radius of the support, thereby to provide an overhanging lip 19 which is tapped to receive a thumb screw 20 for engagement with the rod to secure it against longitudinal displacement.

It will be understood that the line drying rack may be used with any type of fishing rod, a bait casting rod and reel being shown in Figure 1.

The fishing rod is generally designated as 21 and comprises a rod part 22 and a handle portion 23 from which the rod part extends, the handle portion 23 being provided with the usual seat upon which the reel 24 is mounted.

Assuming that the fishing rod has been used and the wet fishing line 26 is wound upon the reel spool, the rod and reel are positioned on the assembled rack with one end of the rod part 22 resting in notch 18 and the opposite end resting in notch 17, the reel and handle being extended beyond the rack as shown in Figure 1. The thumb screw 20 is then tightened upon the rod part 22 (Figure 3) to secure it. The free end of the line is now grasped between the thumb and forefinger of one hand and the wet line is unwound from the reel spool and laced or wound about rollers 11 until it is fully paid out from the reel spool, the lacing of the line about and between the rollers 11 being generally of spiraloid form.

In lacing the line about the roller 11 the sloping walls of the serrations serve to direct the line into the adjacent grooves. The spacing of the convolutions of the line by the serrations prevents contact between them and insures complete exposure of the line to the atmosphere. In lacing the line about the rollers 11 it is not necessary that it be carefully wound so that each course will be evenly spaced from the adjacent course. In practice any winding which separates the courses or convolutions of the line will produce satisfactory results.

The line as left upon the rack will be completely dried in from fifteen minutes to a half hour, depending upon its composition and degree of saturation, and thereafter the line may be completely rewound upon the reel spool by turning the reel handle in the proper direction. In rewinding the dry line upon the reel spool the rollers 11 insure sufficient tension so that the line is compactly wound. However should a more compact winding on the spool be desired greater tension may be obtained by snubbing the line with the fingers in a manner well known to fishermen.

Upon completion of the rewinding of the line on the reel spool the thumb screw 20 is loosened and rod 21 removed from rack. Disassembly of the rack for transportation or storage is accomplished by loosening both thumb screws 7 and withdrawing rod 6 from supports 2 and 3. The relatively small supports may be carried in the usual tackle box while the relatively long tie rod may be carried in the ordinary rod case.

I claim:

A fishing line drying device comprising structurally independent standards, a tie rod connecting the standards, determining their mutual spacing, and detachably connected to them, the standards conjointly having means for the support and securement of the rod element of the fishing line, and a freely rotatable vertical roller element carried by each standard whereby the fishing line may be wound upon and strung between them with its convolutions in spaced relation to insure complete exposure of the fishing line to the air.

TULLY J. ENGLISH.

REFERENCES CITED

The following references are of record in the file of this patent:

UNITED STATES PATENTS

| Number | Name | Date |
|---|---|---|
| 24,782 | Ring | July 12, 1859 |
| 68,438 | Haskell | Sept. 3, 1867 |
| 531,938 | Heston | Jan. 1, 1895 |
| 745,825 | Guthrie | Dec. 1, 1903 |
| 1,635,378 | Mead | July 12, 1927 |
| 2,127,936 | Pierce | Aug. 23, 1938 |

FOREIGN PATENTS

| Number | Country | Date |
|---|---|---|
| 448,895 | France | Sept. 30, 1912 |